US010482764B1

(12) United States Patent
Luomi et al.

(10) Patent No.: US 10,482,764 B1
(45) Date of Patent: Nov. 19, 2019

(54) METHOD, APPARATUS, AND COMPUTER PROGRAM PRODUCT FOR EVALUATING PUBLIC TRANSPORTATION USE

(71) Applicant: HERE Global B.V., Eindhoven (NL)

(72) Inventors: Marko Luomi, Lempäälä (FI); Lauri Aarne Johannes Wirola, Tampere (FI); Tatiana Vyunova, Tampere (FI); Petri Rauhala, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/032,437

(22) Filed: Jul. 11, 2018

(51) Int. Cl.
| | |
|---|---|
| *G08G 1/095* | (2006.01) |
| *G08G 1/127* | (2006.01) |
| *G08G 1/01* | (2006.01) |
| *H04W 4/42* | (2018.01) |
| *H04W 4/02* | (2018.01) |
| *G01C 21/14* | (2006.01) |

(52) U.S. Cl.
CPC .............. *G08G 1/127* (2013.01); *G01C 21/14* (2013.01); *G08G 1/012* (2013.01); *H04W 4/025* (2013.01); *H04W 4/42* (2018.02)

(58) Field of Classification Search
CPC .... G08G 1/127; G08G 1/0125; G08G 1/0129; G08G 1/01; H04W 4/028; G04W 4/029; G06N 5/04
USPC .............. 340/994, 991, 992, 995.28, 3.1, 5.1
See application file for complete search history.

(56) References Cited

U.S. PATENT DOCUMENTS

| | | | |
|---|---|---|---|
| 8,306,848 B1* | 11/2012 | Naphade | G06F 16/29 705/7.31 |
| 9,020,763 B2 | 4/2015 | Faaborg et al. | |
| 10,332,162 B1* | 6/2019 | Brock | G06Q 30/0284 |
| 2013/0185123 A1 | 7/2013 | Krivopaltsev et al. | |
| 2013/0317747 A1* | 11/2013 | Chidlovskii | G06N 5/02 701/540 |
| 2016/0358388 A1 | 12/2016 | Skoglund et al. | |
| 2017/0057316 A1* | 3/2017 | Northrop | B60G 17/019 |
| 2017/0220958 A1 | 8/2017 | Schucan et al. | |

FOREIGN PATENT DOCUMENTS

EP   2667333 A1   11/2013

* cited by examiner

*Primary Examiner* — Toan N Pham
(74) *Attorney, Agent, or Firm* — Alston & Bird LLP (57) ABSTRACT

A method, apparatus, and computer program product are described herein for determining public transportation use. Methods may include receiving probe data points associated with movement of a plurality of people; associating the movement of the plurality of people with a public transit route having a plurality of public transit stop locations; determining, from the probe data points associated with movement of the plurality of people, transit stop locations at which people board a public transit vehicle associated with the public transit route; determining, from the probe data points associated with movement of the plurality of people, transit stop locations at which people exit the public transit vehicle; calculating, from the probe data points associated with the movement of the plurality of people, a number of people boarding the public transit vehicle at each respective transit stop location and a number of people exiting at each respective transit stop location.

22 Claims, 5 Drawing Sheets

METHOD, APPARATUS, AND COMPUTER PROGRAM PRODUCT FOR EVALUATING PUBLIC TRANSPORTATION USE

TECHNOLOGICAL FIELD

An example embodiment of the present invention relates to determining public transportation use, and more particularly, to using location information generated by a user devices, such as a mobile phones, to determine the ridership patterns of users of public transportation to inform exiting route utilization and to generate new routes or route changes to existing routes.

BACKGROUND

The proliferation of mobile devices and devices able to track the location of people as they move has resulted in a vast amount of location-based data, the usefulness of which is still being explored. Understanding the movement of people within a region may provide information to various consumers of such data. The location information may include the location and movement of pedestrians, cyclists, vehicles, etc., such that data may be used in various manners by various entities to understand the movement of people, vehicles, or the like. Data consumers may include traffic planners, merchants, developers (residential/commercial), city planners, etc.

BRIEF SUMMARY

A method, apparatus, and computer program product are provided in accordance with an example embodiment described herein for establishing ridership for public transportation systems and routes. According to an example embodiment, a mapping and routing system is provided that includes a memory having map data thereon, and processing circuitry configured to: receive probe data points associated with movement of a plurality of people; associate the movement of the plurality of people with a public transit route within the map data having a plurality of transit stop locations; determine, from the probe data points associated with movement of the plurality of people, transit stop locations at which people board a public transportation vehicle associated with the public transit route; determine, from the probe data points associated with the movement of the plurality of people, transit stop locations at which people exit the public transit vehicle associated with the public transit route; calculate, from the probe data points associated with the movement of the plurality of people, a number of people boarding the public transit vehicle at each respective transit stop location and a number of people exiting the public transit vehicle at each respective stop; and determine, from the number of people boarding the public transit vehicle at each respective transit stop location and the number of people exiting the public transit vehicle at each respective transit stop location, ridership data associated with the public transit route. According to some embodiments, a mapping and routing system may cause alteration of the public transit route in response to the ridership data associated with the public transit route.

The probe data points of example embodiments may include probe tracks, where each track reflects a path of an individual person, where the processing circuitry configured to determine locations at which people board the public transit vehicle comprises processing circuitry configured to: for each person of the plurality of people, determine if their respective track intersects a first transit stop; determine if a speed associated with the respective track is above a predetermined threshold after the first transit stop; and determine, for each person of the plurality of people, that they boarded the public transit vehicle at the first stop in response to their respective track intersecting the first transit stop and the speed associated with their respective track being above a first predetermined threshold after the first transit stop. The processing circuitry configured to determine locations at which people exit the public transit vehicle may include processing circuitry configured to: for each person of the plurality of people, determine if their respective track diverges from the public transit route at a second transit stop; determine if a speed associated with the respective track is above the first predetermined threshold before the second transit stop; determine if a speed associated with the respective track is below a second predetermined threshold after the second transit stop; and determine, for each person of the plurality of people, that they exited the bus at the second transit stop in response to their track diverging from the public transit route at the second transit stop, the speed associated with their respective track being above the first predetermined threshold before the second transit stop, and the speed associated with their respective track being below the second predetermined threshold after the second transit stop.

According to some embodiments, the probe data tracks may include probe data time at which the probe data points of the probe data tracks were generated. The processing circuitry configured to determine locations at which people board the public transit vehicle may include processing circuitry configured to: for each probe data track, determine if their respective track intersecting the first transit stop coincides with a time associated with the public transit route for the first transit stop; and determine, for each person of the plurality of people, that they boarded the public transit vehicle at the first transit stop in response to the speed associated with their respective track being above a predetermined threshold after the first transit stop and the respective track intersecting the first transit stop coinciding with a time associated with the public transit route at the first transit stop. The processing circuitry configured to cause alteration of the public transit route in response to the ridership data associated with the public transit route may include processing circuitry configured to add or remove transit stops from the public transit route. Ridership data may include a number of people riding the public transit vehicle between each respective public transit stop.

The processing circuitry configured to determine, from the number of people boarding the public transit vehicle at each respective transit stop location and the number of people exiting the public transit vehicle at each respective transit stop location, ridership data associated with the public transit route may include processing circuitry configured to: determine the number of people boarding the public transit vehicle at each respective stop according to the probe data points associated with movement of a plurality of people; determine the number of people exiting the public transit vehicle at each respective public transit stop according to the probe data points associated with movement of a plurality of people; and extrapolate the number of people boarding the public transit vehicle and the number of people exiting the public transit vehicle according to a number of people having boarded the public transit vehicle determined based on a passenger count from a public transit authority. The processing circuitry may optionally be configured to determine route adherence to a timetable of the public transit vehicle along the public transit route based on transit stop locations and time information of the probe data points at the respective transit stop locations.

An apparatus is provided according to some embodiments including at least one processor and at least one memory including computer program code. The at least one memory and computer program code are configured to, with the processor, cause the apparatus to at least: receive probe data points associated with movement of a plurality of people; associate the movement of the plurality of people with a public transit route having a plurality of transit stop locations; determine, from the probe data points associated with movement of the plurality of people, transit stop locations at which people board a public transit vehicle associated with the public transit route; determine, from the probe data points associated with movement of the plurality of people, transit stop locations at which people exit the public transit vehicle associated with the public transit route; calculate, from the probe data points associated with the movement of the plurality of people, a number of people boarding the public transit vehicle at each respective transit stop location, and a number of people exiting the public transit vehicle at each respective transit stop location; and determine, from the number of people boarding the public transit vehicle at each respective transit stop location and the number of people exiting the public transit vehicle at each respective transit stop location, data associated with the public transit route. According to some embodiments, the apparatus may be caused to cause alteration of the public transit route in response to the ridership data associated with the public transit route.

The probe data points include probe data tracks, with each track reflecting the path of an individual person, where causing the apparatus to determine locations at which people board the public transit vehicle may include causing the apparatus to: for each person of the plurality of people, determine if their respective track intersects a first transit stop; determine if a speed associated with the respective track is above a first predetermined threshold after the first transit stop; and determine, for each person of the plurality of people, that they boarded the public transit vehicle at the first transit stop in response to their respective track intersecting the first transit stop and the speed associated with their respective track being above a predetermined threshold. Causing the apparatus to determine locations at which people exit the public transit vehicle may include causing the apparatus to: for each person of the plurality of people, determine if their respective track diverges from the public transit route at a second stop; determine if a speed associated with the respective track is above the first predetermined threshold before the second transit stop; determine if a speed associated with the respective track is below a second predetermined threshold after the second transit stop; and determine, for each person of the plurality of people, that they exited the bus at the second transit stop in response to their track diverging from the public transit route at the second stop, the speed associated with their respective track being above the first predetermined threshold before the second transit stop, and the speed associated with their respective track being below the second determined threshold after the second transit stop.

The probe data tracks include probe data time at which the probe data points of the probe data tracks were generated, where causing the apparatus to determine locations at which people board the public transit vehicles may include causing the apparatus to: for each probe data track, determine if their respective track intersecting the first transit stop coincides with the time associated with the public transit route for the first transit stop; and determine, for each person of the plurality of people, that they boarded the public transit vehicle at the first transit stop in response to the speed associated with their respective track being above the first predetermined threshold after the first transit stop and the respective track intersecting the first transit stop coinciding with a time associated with the public transit route at the first transit stop. Causing the apparatus to cause alteration of the public transit route in response to the ridership data associated with the public transit route includes causing the apparatus to add or remove transit stops from the public transit route. Ridership data includes a number of people riding the public transit vehicle between each respective public transit stop.

Causing the apparatus to determine, from the number of people boarding the public transit vehicle at each respective transit stop location and the number of people exiting the public transit vehicle at each respective transit stop location, ridership data associated with the public transit route may include causing the apparatus to: determine the number of people boarding the public transit vehicle at each respective transit stop location according to the probe data points associated with movement of a plurality of people; determine the number of people exiting the public transit vehicle at each respective transit stop location according to the probe data points associated with movement of a plurality of people; and extrapolate the number of people boarding the public transit vehicle and the number of people exiting the public transport vehicle according to a number of people having boarded the public transit vehicle determined based on a passenger count from a public transit authority. The apparatus may optionally be caused to determine route adherence to a timetable of the public transit vehicle along the public transit route based on transit stop locations and time information of the probe data points at the respective transit stop locations.

Embodiments provided herein may include a method. The method may include: receiving probe data points associated with movement of a plurality of people; associating the movement of the plurality of people with a public transit route having a plurality of public transit stop locations; determining, from the probe data points associated with movement of the plurality of people, transit stop locations at which people board a public transit vehicle associated with the public transit route; determining, from the probe data points associated with movement of the plurality of people, transit stop locations at which people exit the public transit vehicle associated with the public transit route; calculating, from the probe data points associated with the movement of the plurality of people, a number of people boarding the public transit vehicle at each respective transit stop location and a number of people exiting the public transit vehicle at each respective transit stop location; determining, from the number of people boarding the public transit vehicle at each respective transit stop location and the number of people exiting the public transit vehicle at each respective transit stop location, ridership data associated with the public transit route; and causing alteration of the public transit route in response to the ridership data associated with the public transit route.

The probe data points may include probe data tracks, with each track reflecting the path of an individual person, wherein determining locations at which people board the public transit vehicle may include: for each person of the plurality of people, determining if their respective track intersects a first transit stop; determining if a speed associated with the respective track is above a first predetermined threshold after the first transit stop; and determining, for each person of the plurality of people, that they boarded the public transit vehicle at the first transit stop in response to their respective track intersecting the first transit stop and the speed associated with their respective track being above a predetermined threshold after the first transit stop.

Determining locations at which people exit the public transit vehicle may include: for each person of the plurality of people, determining if their respective track diverges from the public transit route at a second transit stop; determining if a speed associated with the respective track is above the first predetermined threshold before the second transit stop; determining if a speed associated with the respective track is below a second predetermined threshold after the second transit stop; and determining, for each person of the plurality of people, that they exited the bus at the second transit stop in response to their track diverging from the public transit route at the second transit stop, the speed associated with their respective track being above the first predetermined threshold before the second transit stop, and the speed associated with their respective track being below a predetermined threshold after the second stop.

The probe data tracks may include probe data time at which the probe data points of the probe data tracks were generated. Determining locations at which people board the public transit vehicle may include: for each probe data track, determining if their respective track intersecting the first transit stop coincides with a time associated with the public transit route for the first transit stop; determining, for each person of the plurality of people, that they boarded the public transit vehicle at the first transit stop in response to the speed associated with their respective track being above the first predetermined threshold after the first transit stop and the respective track intersecting the first transit stop coinciding with a time associated with the public transit route at the first transit stop.

Determining, from the number of people boarding the public transit vehicle at each respective transit stop location and the number of people exiting the public transit vehicle at each respective transit stop location, ridership data associated with the public transit route may include: determining the number of people boarding the public transit vehicle at each respective stop according to the probe data points associated with movement of a plurality of people; determining the number of people exiting the public transit vehicle at each respective stop according to the probe data points associated with movement of a plurality of people; extrapolating the number of people boarding the public transit vehicle and the number of people exiting the public transit vehicle according to a number of people having boarded the public transit vehicle determined based on a passenger count from a public transit authority. Altering the public transit route in response to the ridership data associated with the public transit route includes adding or removing transit stops from the public transit route. Methods may include determining route adherence to a timetable of the public transit vehicle along the public transit route based on transit stop locations and time information fo the probe data points at the respective transit stop locations.

Embodiments provided herein may include an apparatus. The apparatus may include: means for receiving probe data points associated with movement of a plurality of people; means for associating the movement of the plurality of people with a public transit route having a plurality of public transit stop locations; means for determining, from the probe data points associated with movement of the plurality of people, transit stop locations at which people board a public transit vehicle associated with the public transit route; means for determining, from the probe data points associated with movement of the plurality of people, transit stop locations at which people exit the public transit vehicle associated with the public transit route; means for calculating, from the probe data points associated with the movement of the plurality of people, a number of people boarding the public transit vehicle at each respective transit stop location and a number of people exiting the public transit vehicle at each respective transit stop location; means for determining, from the number of people boarding the public transit vehicle at each respective transit stop location and the number of people exiting the public transit vehicle at each respective transit stop location, ridership data associated with the public transit route; and means for causing alteration of the public transit route in response to the ridership data associated with the public transit route.

The probe data points may include probe data tracks, with each track reflecting the path of an individual person, wherein the means for determining locations at which people board the public transit vehicle may include: for each person of the plurality of people, means for determining if their respective track intersects a first transit stop; means for determining if a speed associated with the respective track is above a first predetermined threshold after the first transit stop; and means for determining, for each person of the plurality of people, that they boarded the public transit vehicle at the first transit stop in response to their respective track intersecting the first transit stop and the speed associated with their respective track being above a predetermined threshold after the first transit stop.

The means for determining locations at which people exit the public transit vehicle may include: for each person of the plurality of people, means for determining if their respective track diverges from the public transit route at a second transit stop; determining if a speed associated with the respective track is above the first predetermined threshold before the second transit stop; means for determining if a speed associated with the respective track is below a second predetermined threshold after the second transit stop; and means for determining, for each person of the plurality of people, that they exited the bus at the second transit stop in response to their track diverging from the public transit route at the second transit stop, the speed associated with their respective track being above the first predetermined threshold before the second transit stop, and the speed associated with their respective track being below a predetermined threshold after the second stop.

The probe data tracks may include probe data time at which the probe data points of the probe data tracks were generated. The means for determining locations at which people board the public transit vehicle may include: for each probe data track, means for determining if their respective track intersecting the first transit stop coincides with a time associated with the public transit route for the first transit stop; and means for determining, for each person of the plurality of people, that they boarded the public transit vehicle at the first transit stop in response to the speed associated with their respective track being above the first predetermined threshold after the first transit stop and the respective track intersecting the first transit stop coinciding with a time associated with the public transit route at the first transit stop.

The means for determining, from the number of people boarding the public transit vehicle at each respective transit stop location and the number of people exiting the public transit vehicle at each respective transit stop location, ridership data associated with the public transit route may include: means for determining the number of people boarding the public transit vehicle at each respective stop according to the probe data points associated with movement of a plurality of people; means for determining the number of people exiting the public transit vehicle at each respective stop according to the probe data points associated with movement of a plurality of people; and means for extrapolating the number of people boarding the public transit vehicle and the number of people exiting the public transit vehicle according to a number of people having boarded the public transit vehicle determined based on a passenger count from a public transit authority. The means for causing alteration of the public transit route in response to the ridership data associated with the public transit route includes means for adding or removing transit stops from the public transit route.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for gathering data relating to users of public transportation to better understand how people use public transportation, along with behaviors related to accessing public transportation, user origin, and user destination. This information regarding public transit use may inform public transit planning for new routes, changes to existing routes, and new modes of transportation, such as adding a light rail line to a heavily traveled bus corridor. Increased traffic congestion on roadways, particularly in urban environments, has stressed the importance of a shared transportation model, driven by public transportation modes. With the expansion of city populations, demand for efficient public transportation systems to move people around cities has become critical for reducing traffic volumes and optimizing the movement of people. Optimization of public transportation in terms of access, efficiency, and cost is crucial to implement public transportation strategies that will be used by the public and be cost effective in implementation.

With the advancement of mobile technology, particularly hand held devices such as mobile telephones or smart phones, the location and paths of most people are available to establish how people move about a region. The proliferation of mobile devices capable of reporting locations and paths or "tracks" has led to an increase in available data relating to the movement of people such that this movement can be analyzed and used in order to optimize public transportation options. Since mobile devices are often location aware, it is technically possible to collect data that indicates how people move and analyze that data to understand the transportation needs of urban citizens. While data relating to the movement of people in their environment may be available, privacy is important to retain the trust of people providing the data, such that embodiments described herein can use data in a substantially anonymous manner while still providing data that is essential for public transportation planning and evaluation.

Public transportation in many cities has been developed over the course of decades such that the growth and development of cities may be difficult for aging transportation systems to keep pace with. For example, subway routes or light-rail/trolley service may be along fixed railway lines that were developed and built decades ago when a city had a smaller population distributed in a manner different from today. For example, areas of a city that used to be industrial, that had little public transportation access, may now be redeveloped into residential areas requiring greater public transportation access. As cities continue to grow and develop, it is important to understand how people use public transportation, such as where people enter buses and where they exit, where those people began their trip from (before catching a bus) and where their destination is (after they exit the bus). The aggregation of this information may help inform how bus lanes should be built, where bus stops should be located, where routes should be located, etc. While embodiments described herein generally relate to bus transportation, embodiments may be applied in a similar manner to any group transportation mode, such as metro/subway lines, trains, ferries, ride-share programs (e.g., car pools and van pools), or the like. Further, with the advancement of autonomous vehicles and the potential for autonomous transportation modes, embodiments may be implemented for autonomous vehicle transportation along routes in manners similar to buses or ride-share programs.

Currently, transit systems and bus companies are able to collect data about entering passengers through ticketing/fare based systems. This means that the transit system may build relatively accurate statistics about passengers entering a bus along a route at the various stops. However, transit systems do not currently access information relating to when and where passengers exit. As such, accurate statistics about bus line utilization is limited and cannot be relied upon to understand how people use the transportation system after entering a bus at a stop.

Embodiments described herein may receive pedestrian/passenger behavior data, analyze that behavior data, and provide a more accurate model of how public transportation is used in order to optimize public transportation and improve the efficiency thereof. A system, as illustrated in FIG. 1, a transit system provider may gather data relating to user equipment and analyze that data to determine how public transportation is utilized.

Figure 1:
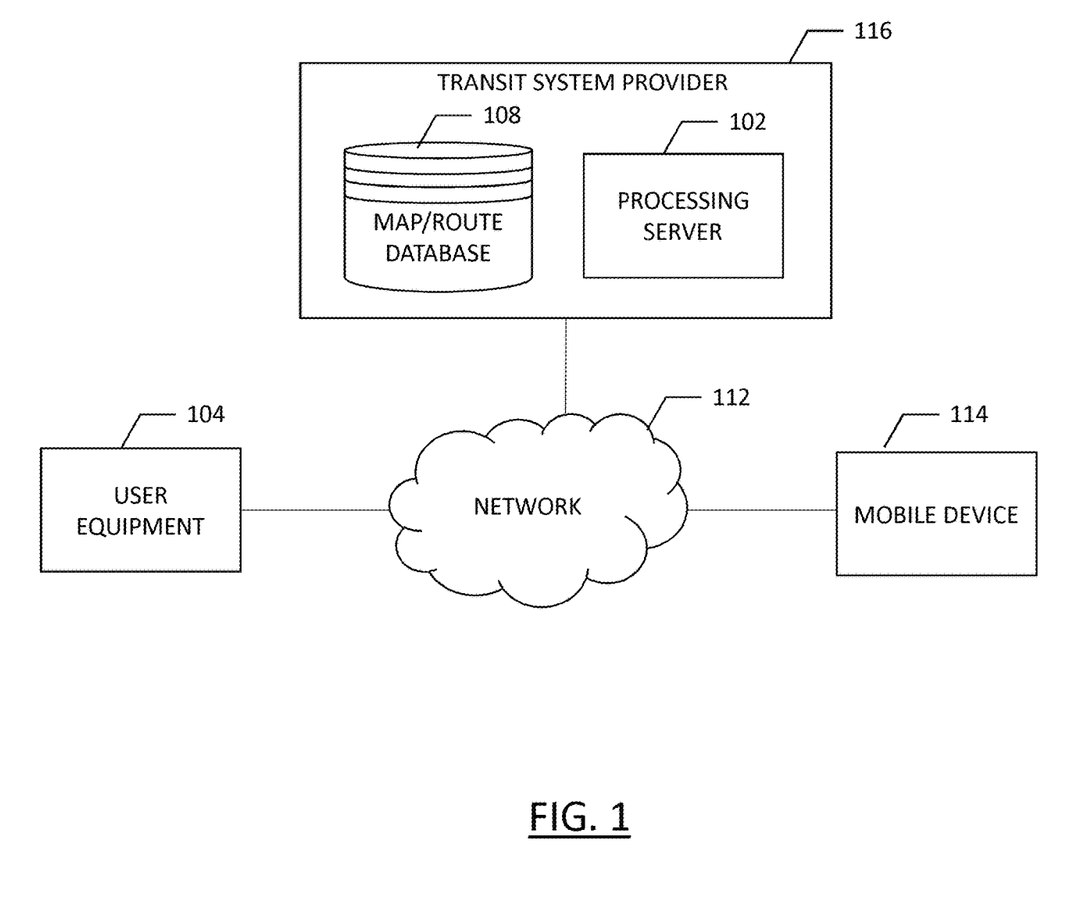
FIG. 1 illustrates a communications diagram in accordance with an example embodiment of the present invention.

FIG. 1 illustrates a communication diagram of an example embodiment of a system for implementing example embodiments described herein. The illustrated embodiment of FIG. 1 includes a transit system provider 116, a processing server 102 in data communication with a user equipment (UE) 104 through a network 112, and one or more mobile devices 114. The mobile device 114 may be associated, coupled, or otherwise integrated with a vehicle, such as in a transit vehicle's locationing equipment, infotainment unit, or an advanced driver assistance system (ADAS), for example. Additional, different, or fewer components may be provided. For example, many mobile devices 114 may connect with the network 112. The transit system provider 116 may include computer systems and a network of a system operator. The processing server 102 may include the map/route database 108, such as provided by a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Processing server 102 may be one or more fixed or mobile computing devices. The user equipment 104 may be configured to access a map/route database 108 via the processing server 102 through, for example, a transit mapping application, such that the user equipment may provide navigational assistance to a user among other services provided through access to the transit system provider 116. The user equipment 104 may therefore be a user interactive device that provides a user with information related to navigation which may include pedestrian navigation, navigation among public transit systems (e.g., including trains, buses, rideshare vehicles, etc.), or vehiclular navigation. The user equipment 104 may guide a user along a path from an origin to a destination, or provide an indication of available paths and points of interest around a user. User equipment 104 may optionally provide a user with instruction regarding where to access public transit vehicles (e.g., a bus or train stop) and when those vehicles may be accessed (e.g., a time table or route schedule). Such implementation may provide a seamless navigational assistant to a user to help them travel from an origin to a destination using multiple modes of transportation. The mobile device 114 may be integrated with or separate from user equipment 104, where the mobile device may provide probe data related to the location of an associated user or vehicle, for example. The mobile device 114 may be a device that is part of the internet of things (IoT) where location and identification may be provided to the network to inform the network of the locations of vehicles, people, or the like. User equipment 104 and mobile device 114, whether integrated together or as separate devices may work in concert to facilitate embodiments of the present invention described herein.

The map/route database 108 may include node data, road segment data or link data, point of interest (POI) data, or the like. The map/route database 108 may also include cartographic data, routing data, and/or maneuvering data. While the map/route database 108 may provide conventional mapping and navigational services, the map/route database 108 may also include information pertaining to the routes of transportation modes within the transit system. For example, the map/route database 108 may include a map database and bus routes within that mapped region, and the routes may include waypoints (e.g., bus stops, stations, or terminals), along with route schedules and times. Further, the map/route database 108 may track the progress of transit vehicles along a route for analysis and confirming that a route is being performed within a predetermined range of the time for that route.

Beyond the routing data and schedules that may be maintained by the map/route database 108, according to some example embodiments, the map/route database 108 may include road segment data and general map information. The road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map/route database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map/route database 108 can include data about the POIs and their respective locations in the POI records. The map/route database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map/route database 108 can include event data (e.g., traffic incidents, construction activities, scheduled events, unscheduled events, etc.) associated with the POI data records or other records of the map/route database 108.

As described further below, the map/route database 108 may also include information pertaining to pedestrian behavior in or around road segments of the network of road segment. This pedestrian behavior data may be developed based on observed pedestrian behavior gathered through, for example, mobile device tracking of pedestrians or visual detection of pedestrians along a road segment (e.g., through cameras such as traffic cameras). The pedestrian data gathered may include data such as time of day, day of the week, day of the month and year, etc. While embodiments described herein may generally reference pedestrian behavior, behaviors of other types of transportation may be gathered, such as cyclists, which may be distinguished from pedestrians based on their speed or based on the visual detection features.

The map/route database 108 may be maintained by a content provider e.g., a transit system provider or map developer. By way of example, the map developer can collect geographic data to generate and enhance the map/route database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map/route database 108 may be a master map/route database stored in a format that facilitates updating, maintenance, and development. For example, the master map/route database or data in the master map database can be in an Oracle spatial format or other spatial format, such as for development or production purposes. The Oracle spatial format or development/production database can be compiled into a delivery format, such as a geographic data file (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. Further, data may be compiled relating to the behavior of pedestrians within a geographic region, particularly as the pedestrian behavior relates to interaction with public transportation. The navigation-related functions can correspond to vehicle navigation, pedestrian navigation, or other types of navigation. This may include providing navigation for a driver of a public transit vehicle along a route, navigation for an autonomous public transit vehicle along a route, navigation for a pedestrian looking for public transportation access, etc. The compilation of data and information to produce the end user databases can be performed by a party or entity separate from the map developer. For example, a customer of the map developer, such as a navigation device developer, transit system provider 116 or other end user device developer, can perform compilation on a received map database in a delivery format to produce one or more compiled navigation databases.

As mentioned above, the server side map/route database 108 may be a master geographic database, but in alternate embodiments, a client side map/route database 108 may represent a compiled navigation database that may be used in or with end user devices (e.g., user equipment 104) to provide navigation and/or map-related functions. For example, the map/route database 108 may be used with the end user device 104 to provide an end user with navigation features, personal planning of public transit, and estimated pedestrian behaviors. In such a case, the map/route database 108 can be downloaded or stored on the end user device (user equipment 104) which can access the map/route database 108 through a wireless or wired connection, such as via a processing server 102 and/or the network 112, for example.

In one embodiment, the end user device or user equipment 104 can be an in-vehicle navigation system, such as an advanced driver assistance system (ADAS), a personal navigation device (PND), a portable navigation device, a cellular telephone, a smart phone, a personal digital assistant (PDA), a watch, a camera, a computer, and/or other device that can perform navigation-related functions, such as digital routing and map display. In the embodiment of a transit vehicle, the user equipment 104 may be a route adherence and communication apparatus to communicate between the transit system provider and the transit vehicle. Such a device may ensure the transit vehicle is on the route and on time, and may facilitate personal transit planning for users by advising users of a certain route and the timing thereof. In such an embodiment, timetables may be maintained, such as at transit system provider 116, that describe a location and a time at which a particular transit vehicle traveling along a particular route is to be at each of a plurality of route-specific destinations. These route-specific destinations may include stops, such as bus stops or train stops, and may be associated with a specific time at which a transit vehicle should depart a specific stop. The route-specific destinations may optionally include waypoints between transit vehicle stops, particularly when there is a substantial distance between stops or a substantial amount of time, as the waypoints may provide an indication as to whether the transit vehicle is within a predetermined time window at each waypoint and stop in order to maintain timeliness along the route. Such waypoint and transit vehicle stop locations along with their respective times and predetermined time windows may be used to ensure route adherence, and to facilitate reporting of any failures in route adherence. Route adherence may not require hardware installed on a transit vehicle or location information for a transit vehicle, and may optionally use location information from transit vehicle riders once it is established that the user is aboard a transit vehicle. Further, route adherence may use the time a user boards a transit vehicle or departs a transit vehicle to verify a time at which a vehicle is at a transit vehicle stop. An end user can use the user equipment 104 for navigation and map functions such as guidance and map display, for example, and for determination of one or more personalized routes or route segments based on one or more calculated and recorded routes, according to some example embodiments.

The processing server 102 may receive probe data, directly or indirectly, from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle, or in some cases, the position of a pedestrian or cyclist. This data also referred to generally herein as "probe data", may be collected by any device capable of determining the necessary information, and providing the necessary information to a remote entity. The mobile device 114 is one example of a device that can function as a probe to collect probe data of a vehicle, probe data from a pedestrian, or probe data indicative of a person on a public transportation vehicle.

More specifically, probe data (e.g., collected by mobile device 114) may be representative of the location of a person at a respective point in time and may be collected while a person is traveling along a route, or indicative of the location of a pedestrian at a respective point in time and may be collected while a pedestrian is walking along a path. While probe data is described herein as being probe data associated with an individual person, example embodiments may be implemented with vehicle probe data, or non-motorized vehicle probe data (e.g., from bicycles, skate boards, horseback, etc.). For example, a vehicle (motorized or non-motorized) may be driven to a train station where a user may catch a train to their final destination, or to a park-and-ride where the user may catch a bus or other mode of transportation. According to the example embodiments described below with the probe data being from pedestrians, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. personal identifier, user identifier, or the like), a time stamp associated with the data collection, or the like. The mobile device 114 may be any device capable of collecting the aforementioned probe data. Some examples of the mobile device 114 may include mobile devices, such as phones or personal data assistants, or the like.

Figure 2:
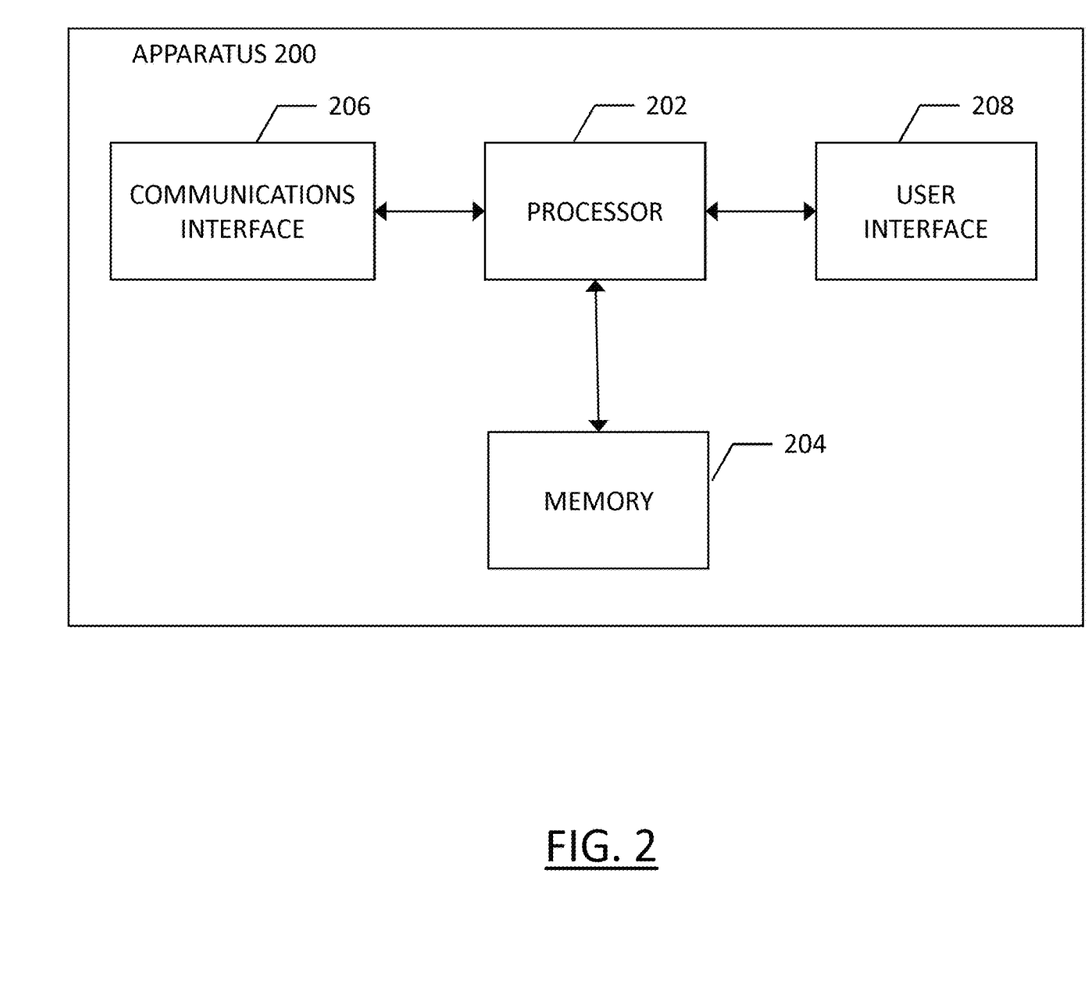
FIG. 2 is a block diagram of an apparatus that may be specifically configured for determining public transportation usage in accordance with an example embodiment of the present invention.

An example embodiment of a processing server 102 may be embodied in an apparatus as illustrated in FIG. 2. The apparatus, such as that shown in FIG. 2, may be specifically configured in accordance with an example embodiment of the present invention for determining pedestrian behavior, and more particularly, for providing information regarding pedestrian utilization of public transportation. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for using crowd-sourced pedestrian probe data in conjunction with public transit routing data to establish usage of public transportation and patterns of public transportation riders as to where passengers board and depart from transit vehicles. Pedestrian data may be collected through probes, such as mobile device 114, that collect data points in the form of an ordered list of locations where the person has traveled and a time associated with each location. Generally, the location of a probe may be determined using a global navigation satellite system (GNSS), an example of which is the United States' global positioning system (GPS). Other examples of GNSS systems are GLONASS (Russia), Galileo (European Union) and Beidou/Compass (China), all systems having varying degrees of accuracy. Further, location may be established using cellular signal triangulation, wireless signal fingerprinting such as using WiFi, wireless access point location, real-time locationing systems (RTLS) using radio frequency tags, or the like. The source of this location data may be, for example, a mobile device such as a smart phone or cellular telephone that a person may carry with them, a tracking device attached to a person or an object they are carrying, or any type of device that is capable of recording a location and time for the device. While many devices may transmit this data either in real time (e.g., transmitting a location to a server or map database while the device is at the location), or periodically (e.g., transmitting one or more locations at which the device is located or has been located since the prior transmission), devices may collect this data and store it locally, such as on a fitness tracking device, where that stored data may be later uploaded to a server or map database, for example when the device connects to a home network (e.g., Wi-Fi), or the like. The probe data from a pedestrian, according to example embodiments described herein does not require real-time location data and the data can be later gathered; however, generally the data points from the probe include both a time (including date) and location.

Additional data may be included with probe data, such as a person's heading, personal identification, environmental conditions, or the like; however, for purposes of at least some of the embodiments described herein, the probe data may at least include location and time, while other data may be superfluous or may be used to provide additional features. The time associated with probe data may include date and time, while the GPS location may include coordinates, such as longitude and latitude of the location. A heading may include a compass direction or a degree heading, while a speed may be any unit of measure of the speed of the probe. Speed data of a probe may be used to establish that data from a particular probe is from that of a pedestrian. Location data may indicate that a probe is traveling along a pedestrian walkway, such as a sidewalk; however, due to inaccuracies in some location systems, such as GPS, and particularly in urban settings, location alone may not be sufficient to establish probe data as belonging to a pedestrian. Speed data may be more reliable in this regard, and may be established by individual probe data points, where the probe data point includes a speed at the time and location of that data point. Optionally, speed may be established through a series of two or more probe data points, determining speed based on the distance traveled over a time between the probe data points.

When a portable device, such as a smart phone or cellular telephone is used for generation of probe data, establishing probe data as pedestrian probe data may not be trivial as it may involve the analysis of a plurality of probe data points over time to establish position, speed, heading, directional changes, routes taken, or the like. For example, a person who is running or walking quickly along a roadway that has heavy traffic may be moving as quickly as the traffic moves, such that speed alone may not be sufficient to establish that the probe data is that of a pedestrian. In such an example, additional data may be used, such as directional change or accelerations. A pedestrian is able to abruptly change direction and change direction in virtually any available direction, whereas vehicles are not nearly as capable. The probe data directional changes or accelerations may be used to contribute to establishing the probe data as that of a pedestrian. Further, probe data may be monitored for a period of time to establish whether or not it is pedestrian or vehicle probe data. For example, if a probe is moving along a roadway at a walking pace, that probe data could be from a pedestrian, or from a vehicle that is in traffic, or possibly searching for a parking space. The probe data from that portion of a probe data trace that is potentially pedestrian may be temporarily stored or flagged as data uncertain of source (e.g., pedestrian or vehicular). If the probe data in that trace following a path accelerates to twenty miles-per-hour, it becomes evident that the probe data or at least a portion thereof, is not pedestrian, and the probe data may be discarded for consideration as pedestrian data.

According to some embodiments, probe data traces may be analyzed in segments or tracks to establish whether the probe data is vehicular or pedestrian, as a pedestrian may walk to a vehicle, such as their car, a bus, or a train, and the pedestrian probe data may cease to be pedestrian and become vehicular. The determination of whether probe data is pedestrian or vehicular may further consider whether the probe data trace includes therein a bus stop, train station, or vehicle parking facility along the locations in the trace. The inclusion of such a point of interest may suggest that the probe data trace is transitioning between pedestrian and vehicular probe data. As noted above, the location trace of a user may identify where a user boards a public transit vehicle or departs a public transit vehicle, and a timestamp associated with the boarding or departing of a public transit vehicle to establish the arrival (or departure) of a public transit vehicle at a particular time. Optionally, a ticketing system may confirm the arrival/departure time of a public transit vehicle from a particular transit vehicle stop, and may determine route adherence from the time and location.

Probe data that is gathered may be associated with mapped paths, such as roadways, train routes, bus routes, pedestrian walkways, or the like. Map data, such as the map data contained in map/route database 108 of the transit system provider 116 or a map service provider may include links, where each roadway in a mapped network comprises a series of interconnected links. Similarly, pedestrian paths may be mapped as a series of interconnected links. Each link is associated with attributes about the geographical segment that they represent. A link may include link geometry data that is a list of coordinates that represent the geographical entity. Links may also include a total length of the geographic segment they represent.

While probe data may be collected indicative of pedestrian location, movements, and pedestrian paths, probe data may also be gathered from public transportation vehicles to establish location, movement, and paths. However, embodiments described herein may not necessitate or rely upon probe data from public transportation vehicles. Bus routes including paths along road segments, public transit stop locations, and times associated with stops are publicly known and available information, often available as open data from transit authorities and municipalities and virtually always available in some form online from municipal websites or those belonging to a transit company.

Figure 3:
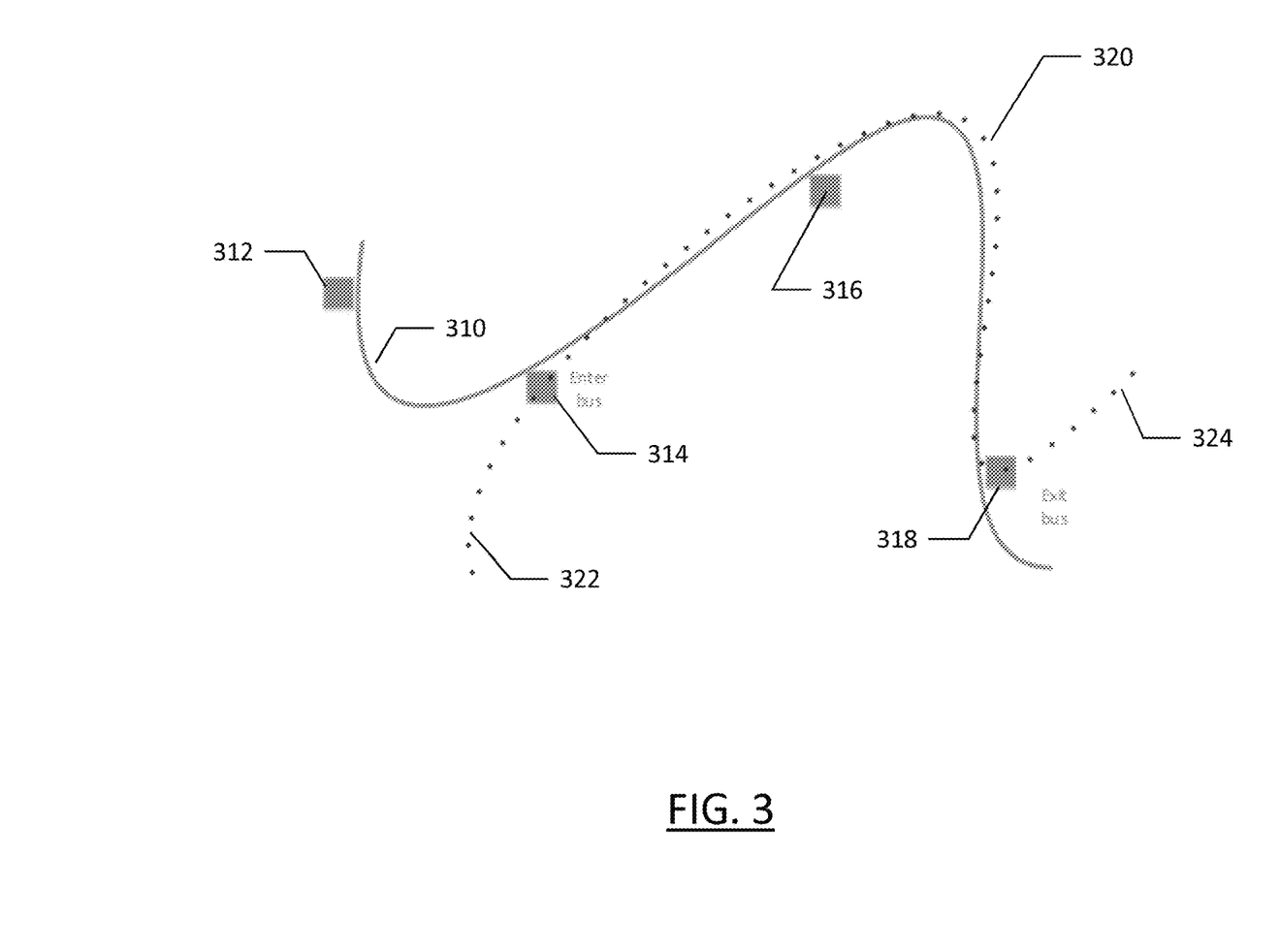
FIG. 3 is an illustration of a pedestrian path and a public transit route including public transit stops according to an example embodiment of the present invention.

FIG. 3 illustrates an example embodiment of crowd sourced pedestrian data illustrated by the dotted-line path segment 320 including the beginning segment 322 and ending segment 324. The solid line 310 represents a public transportation route, such as a bus route. Elements 312, 314, 316, and 318 represent bus stops. A pedestrian path 320 may be a collection of probe data points from a user's mobile device, for example, that are map-matched to a path on a map in a map database, such as in the map/route database 108 of FIG. 1. The public transit route 310 may be generated on the map based on a planned and scheduled route for the transit vehicle. The pedestrian path 320 may be compared against the public transit route 310 to determine a correlation between the two. An overlap between the two suggests a portion of the pedestrian's path 320 was aboard a public transit vehicle. While the overlapping paths, between bus stops 314 and 318 suggest that the pedestrian boarded and later departed the public transit vehicle along route 310, other factors may be considered to more definitively tie the person's path to the public transit vehicle and route.

According to an example embodiment, a time of operation along the route 310 may be considered against a time at which the pedestrian overlapped the public transit route 310. A pedestrian may walk along a public transit route without riding public transit; however, if the pedestrian's time along the public transit route coincides with a scheduled public transit vehicle route, there is a higher likelihood that the pedestrian took public transit. Further, the probe data points that make up the pedestrian path 320 may include a speed associated with the probe location, where the speed of the probe data point may be used to determine the mode of transportation of the person. For example, if the speed of the pedestrian along pedestrian route portion 322 is two miles per hour, but increases to twenty miles per hour after the pedestrian route 320 coincides with the public transit route 310, the likelihood that the pedestrian boarded public transit rises considerably. Similarly, if the probe data points that make up the pedestrian path 320 include a time, a speed between the probe data points may be calculated by dividing the distance between probe data points by the time. This may provide the speed of the person which may contribute to the evaluation of whether the person is a pedestrian or has boarded public transit.

According to the illustrated embodiment of FIG. 3, a pedestrian path of a person approaches bus stop 314 along path 322. The person's path coincides with the public transit path 310 between transit stop 314 and transit stop 318. After transit stop 318, the person's path diverges from the transit path 310 along path 324. As such, it is determined that a pedestrian walked to transit stop 314, boarded the transit vehicle traveling along transit route 310, and departed the transit vehicle at transit stop 318, where the person walked along path 324 away from the transit stop.

While pedestrian path 320 is illustrated as a continuous path of a single probe, example embodiments may use path segments rather than longer, more complete paths. The use of path segments limited to a predetermined amount of time, a predetermined distance, or a predetermined number of probe data points may be necessitated through privacy laws or rules such that a person's entire path may not be followed. Example embodiments described herein may use complete paths or path segments in a similar manner. While complete paths may be able to describe the origin and destination of an individual, path segments may remain beneficial as they provide an indication of where people are coming from or going to, while not necessarily understanding the entire path of the individual users.

Figure 4:
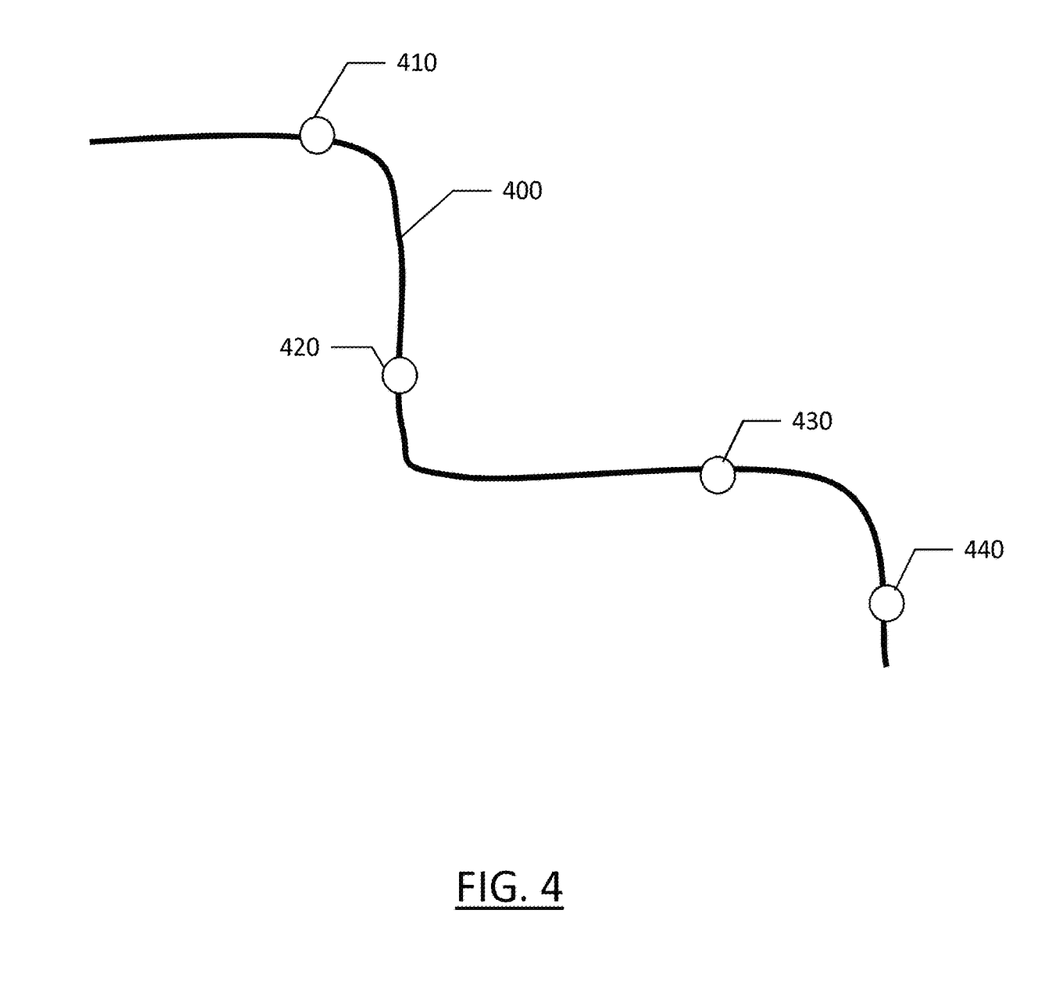
FIG. 4 is an illustration of a public transit route including public transit stops according to an example embodiment of the present invention.

Embodiments described herein may be instrumental in establishing the use of public transit and the tendencies of riders of public transit as to where they board, where they exit, and how many people are boarding, exiting, and traveling along a particular route or portion of a route. FIG. 4 illustrates an example transit route that is a bus route 400 including bus stops 410, 420, 430, and 440. Conventional ticketing means may be used to determine the volume of passengers that ride bus along route 400, and may indicate the number of journeys that originate from a particular location. Using crowd sourced probe data, such as the probe data path 320 illustrated in FIG. 3, crowd sourcing probe data tracks or path segments may establish a number of passengers that exit a bus at each of the stops.

According to an example embodiment, it is established through ticketing information that 300,000 journeys along route 400 were started from stop 410 over a predetermined period of time. Crowd sourced path data may indicate that 300 journeys were initiated from stop 410. The crowd sourced path data may also indicate the number of passengers exiting the bus at teach stop. According to the described embodiment, 50 passengers exit at stop 420, 150 passengers exit at stop 430, and 100 passengers exit at stop 440. Based on the proportionality of passengers exiting according to the crowd sourced data, the number of passengers in total that exit at each stop 420, 430, and 440 may be estimated. If there are 300,000 total known journeys originating from stop 410, and the crowd sourced probe data represented a sample size of 300 journeys, the following conclusions can be reached:

Passengers exiting at bus stop 420=(300,000/300)
*50=50,000 passengers

Passengers exiting at bus stop 430=(300,000/300)
*150=150,000 passengers

Passengers exiting at bus stop 440=(300,000/300)
*100=100,000 passengers

The estimates described above use crowd sourced probe data extrapolated according to known passenger ridership data to estimate the number of passengers exiting a bus route at a particular stop. The aforementioned algorithm is merely an example of a method of establishing ridership data from crowd sourced data. Embodiments may use more complex algorithms that include time-weighted components, such as passengers exiting a bus in the busiest times of day may be given greater weight than passengers exiting a bus at a time of day where ridership is exceedingly low. Further, algorithms may factor in weather, route length, population centers, or other factors that may influence the calculated estimate of passengers based on a subset of passengers providing crowd sourced data. The crowd sourced probe data may be gathered over the same period of time as the total number of passengers are gathered, or optionally, the crowd sourced data may be gathered over a condensed period of time. However, it is desirable that if the crowd sourced data is gathered over a condensed period of time, that it is gathered in conditions that replicate those in which total ridership numbers were gathered. For example, using the example embodiment of FIG. 4, bus stop 440 may correspond to an office complex, while bus stop 420 may correspond to a shopping complex. During weekdays, a greater proportion of people may exit the bus at the office complex to reach a job that includes a conventional Monday through Friday schedule. However, on weekends, the proportion of passengers exiting the bus at stop 440 may fall considerably, while the number of passengers exiting at the shopping complex at stop 420 may increase considerably. As such, it may be important to consider context when gathering probe data points for a transit route, where the context of the probe data points is similar or representative of the context over which the total ridership numbers are calculated.

The ridership data reflecting the number of passengers boarding a public transit vehicle at each public transit stop location and the data reflecting the number of passengers exiting the public transit vehicle may provide detailed information regarding ridership of the public transit vehicle route and may enable transit authorities to adjust routes, schedules, stops, etc. according to the ridership data ascertained through pedestrian probe data as described above. In this manner, ridership data can inform transit authorities on how to change existing routes, add new routes, and plan for different modes of public transit. For example, if it is established that ridership along a specific route is high during particular times of the year, seasonal service may be added to the route to alleviate the added ridership. Further, if probe data tracks from pedestrians indicate that pedestrians may exit a public transit vehicle at a transit stop location, and back-track along the public transit route to reach their destination, the transit authority may add a stop or move a stop back along the route to correspond to where pedestrians are heading when they exit the transit vehicle.

Ridership data may also be used to establish behavioral patterns of pedestrians/transit riders as to where transit riders may tend to board or exit transit vehicles. Such behavioral patterns may provide information for retailers looking to capitalize on foot traffic or on serving the specific needs of transit riders, for example. The behavioral patterns of pedestrians/transit riders may be used to inform businesses proximate transit vehicle stops of when pedestrian traffic is likely to be near the business, such that a business may craft its hours around when transit riders exit a transit vehicle and are proximate the business. For example, certain transit routes may have early morning routes where pedestrian traffic near a business is unknown to a business owner; however, based on ridership data established according to embodiments described herein, the business owner may be informed of the missed opportunity and open their business earlier to capture the pedestrian traffic advantage that was previously unknown. Ridership data may also influence rent rates for businesses and rental properties near transit vehicle stops as business and property owners identify and understand the desirable proximity of their businesses and properties relative to transit ridership information.

Ridership data may also provide municipalities with information regarding where pedestrians are likely to walk, such that pedestrian routes relative to transit vehicle stops may be prioritized according to ridership information for clearing of snow or ice from pedestrian walkways or sidewalks, and where sidewalk clean up efforts (e.g., litter collection) may require more concerted effort. Further, advertisers may use ridership data for advertisement placement both on the public transit vehicles, such as advertising businesses proximate popular public transit stops, or at public transit stops where riders board or exit public transit vehicles. Advertisements on public transit vehicles, such as advertisements on digital screens within the vehicle, may be adjusted based on ridership data schedules that indicates where riders are likely to exit a public transit vehicle at different times of the day. For example, restaurants proximate popular public transit stops may be advertised during lunch time or dinner time, but not advertised outside of those times when other advertisements may be more specifically targeted to riders. The ridership data may inform advertising strategies that result in greater impact on public transit riders and provide a better return on investment for the advertisers. Transit systems or third party companies that provide the advertising medium may be able to capitalize on prime ridership times to increase advertising prices commensurate with their reach as supported by ridership data.

Ridership data may further provide information that may assist companies looking to capitalize on foot traffic, such as shared bicycles or scooters. Shared bicycles and scooters have become popular modes of transportation for the "first mile" and "last mile" of transportation between a pedestrian's origin and destination. The "first mile" is considered the part of a pedestrian's route between their origin (e.g., their home) and a public transit stop. The "last mile" is the part of a pedestrian's route between a public transit stop and their destination (e.g., their work). Shared bicycles and scooters, including both docked bicycles and scooters and undocked bicycles and scooters may be uniquely suited for the "first mile" and "last mile" portions of a person's route as they are user directed transport. For these shared bicycle and scooter companies, understanding where to station the bicycles and scooters and any associated docking station is of critical importance. Ridership data from public transit systems may provide unique information that is ideally suited for the placement of shared bicycles and scooters, along with a volume of bicycles and scooters that may be necessary.

Figure 5:
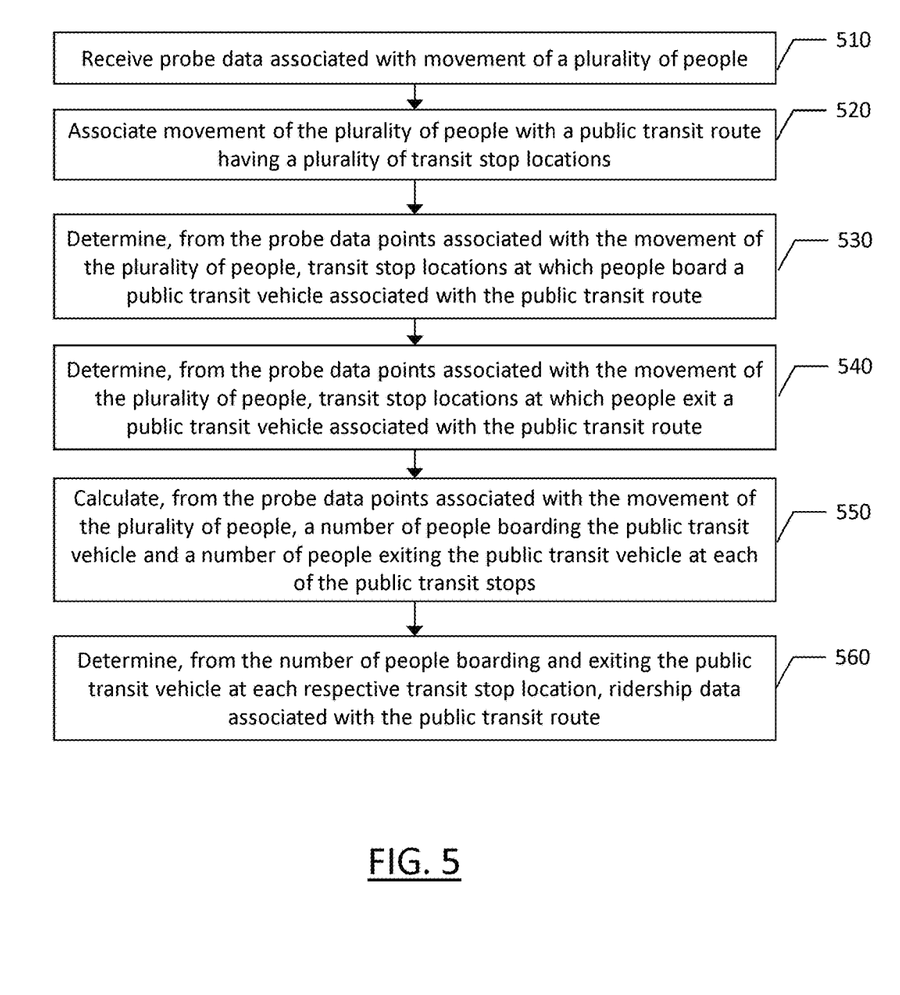
FIG. 5 is a flowchart of a method for establishing public transportation usage according to an example embodiment of the present invention.

FIG. 5 illustrates a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 5 illustrates a flowchart of a method of evaluating crowd-sourced probe data from users to determine how public transportation is used. As shown, at 510 probe data is received that is associated with the movement of a plurality of people. The probe data is then associated with a public transit route having a plurality of transit stop locations at 520. At 530, it is determined from the probe data points associated with the movement of the plurality of people, transit stop locations at which people board a public transit vehicle associated with the public transit route. At 540, it is determined from the probe data points associated with the movement of the plurality of people, transit stop locations at which people exit a public transit vehicle associated with the public transit route. A number of people boarding the public transit vehicle and a number of people exiting the public transit vehicle at each of the public transit stops are calculated from the probe data points as shown at 550. Based on the number of people boarding and exiting the public transit vehicle at each respective transit stop location, ridership data associated with the public transit route is determined at 560.

In an example embodiment, an apparatus for performing the method of FIG. 5 above may comprise a processor (e.g., the processor 202) configured to perform some or each of the operations 510-560) described above. The processor may, for example, be configured to perform the operations (510-560) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-560 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A mapping system comprising:
   a memory comprising map data; and
   processing circuitry configured to:
   receive probe data points associated with movement of a plurality of people;
   associate the movement of the plurality of people with a public transit route within the map data having a plurality of transit stop locations;
   determine, from the probe data points associated with movement of the plurality of people, transit stop locations at which people board a public transit vehicle associated with the public transit route;
   determine, from the probe data points associated with movement of the plurality of people, transit stop locations at which people exit the public transit vehicle associated with the public transit route;
   calculate, from the probe data points associated with the movement of the plurality of people, a number of people boarding the public transit vehicle at each respective transit stop location, and a number of people exiting the public transit vehicle at each respective transit stop location; and
   determine, from the number of people boarding the public transit vehicle at each respective transit stop location and the number of people exiting the public transit vehicle at each respective transit stop location, ridership data associated with the public transit route.

2. The mapping system of claim 1, wherein the probe data points comprise probe data tracks, with each track reflecting a path of an individual person, wherein the processing circuitry configured to determine locations at which people board the public transit vehicle comprises processing circuitry configured to:
   for each person of the plurality of people, determine if their respective track intersects a first transit stop;
   determine if a speed associated with the respective track is above a first predetermined threshold after the first transit stop; and
   determine, for each person of the plurality of people, that they boarded the public transit vehicle at the first transit stop in response to their respective track intersecting the first
   transit stop and the speed associated with their respective track being above the first predetermined threshold after the first transit stop.

3. The mapping system of claim 2, wherein the processing circuitry configured to determine locations at which people exit the public transit vehicle comprises processing circuitry configured to:
   for each person of the plurality of people, determine if their respective track diverges from the public transit route at a second transit stop;
   determine if a speed associated with the respective track is above the first predetermined threshold before the second transit stop;
   determine if a speed associated with the respective track is below a second predetermined threshold after the second transit stop; and
   determine, for each person of the plurality of people, that they exited the bus at the second transit stop in response to their track diverging from the public transit route at the second transit stop, the speed associated with their respective track being above the first predetermined threshold before the second transit stop, and the speed associated with their respective track being below the second predetermined threshold after the second transit stop.

4. The mapping system of claim 2, wherein the probe data tracks comprise probe data time at which time the probe data points of the probe data tracks were generated, wherein the processing circuitry configured to determine locations at which people board the public transit vehicle comprises processing circuitry configured to:
for each probe data track, determine if their respective track intersecting the first transit stop coincides with a time associated with the public transit route for the first transit stop; and
determine, for each person of the plurality of people, that they boarded the public transit vehicle at the first transit stop in response to the speed associated with their respective track being above the first predetermined threshold after the first transit stop and the respective track intersecting the first transit stop coinciding with a time associated with the public transit route at the first transit stop.

5. The mapping system of claim 1, wherein the processing circuitry configured to determine, from the number of people boarding the public transit vehicle at each respective transit stop location and the number of people exiting the public transit vehicle at each respective transit stop location, ridership data associated with the public transit route comprises processing circuitry configured to:
determine the number of people boarding the public transit vehicle at each respective transit stop location according to the probe data points associated with movement of a plurality of people;
determine the number of people exiting the public transit vehicle at each respective transit stop location according to the probe data points associated with movement of a plurality of people; and
extrapolate the number of people boarding the public transit vehicle and the number of people exiting the public transit vehicle according to the number of people having boarded the public transit vehicle determined based on a passenger count from a public transit authority.

6. The mapping system of claim 1, further comprising processing circuitry configured to cause alteration of the public transit route in response to the ridership data associated with the public transit route by adding or removing transit stops from the public transit route.

7. The mapping system of claim 1, wherein ridership data comprises a number of people riding the public transit vehicle between each respective public transit stop.

8. The mapping system of claim 1, further comprising processing circuitry configured to:
determine route adherence to a timetable of the public transit vehicle along the public transit route based on transit stop locations and time information of the probe data points at the respective transit stop locations.

9. An apparatus comprising at least one processor and at least one memory including computer program code, the at least one memory and computer program code configured to, with the processor, cause the apparatus to at least:
receive probe data points associated with movement of a plurality of people;
associate the movement of the plurality of people with a public transit route having a plurality of transit stop locations;
determine, from the probe data points associated with movement of the plurality of people, transit stop locations at which people board a public transit vehicle associated with the public transit route;
determine, from the probe data points associated with movement of the plurality of people, transit stop locations at which people exit the public transit vehicle associated with the public transit route;
calculate, from the probe data points associated with the movement of the plurality of people, a number of people boarding the public transit vehicle at each respective transit stop location, and a number of people exiting the public transit vehicle at each respective transit stop location; and
determine, from the number of people boarding the public transit vehicle at each respective transit stop location and the number of people exiting the public transit vehicle at each respective transit stop location, ridership data associated with the public transit route.

10. The apparatus of claim 9, wherein the probe data points comprise probe data tracks, with each track reflecting a path of an individual person, wherein causing the apparatus to determine locations at which people board the public transit vehicle comprises causing the apparatus to:
for each person of the plurality of people, determine if their respective track intersects a first transit stop;
determine if a speed associated with the respective track is above a first predetermined threshold after the first transit stop; and
determine, for each person of the plurality of people, that they boarded the public transit vehicle at the first transit stop in response to their respective track intersecting the first transit stop and the speed associated with their respective track being above the first predetermined threshold after the first transit stop.

11. The apparatus of claim 10, wherein causing the apparatus to determine locations at which people exit the public transit vehicle comprises causing the apparatus to:
for each person of the plurality of people, determine if their respective track diverges from the public transit route at a second transit stop;
determine if a speed associated with the respective track is above the first predetermined threshold before the second transit stop;
determine if a speed associated with the respective track is below a second predetermined threshold after the second transit stop; and
determine, for each person of the plurality of people, that they exited the bus at the second transit stop in response to their track diverging from the public transit route at the second transit stop, the speed associated with their respective track being above the first predetermined threshold before the second transit stop, and the speed associated with their respective track being below the second predetermined threshold after the second transit stop.

12. The apparatus of claim 10, wherein the probe data tracks comprise probe data time at which time the probe data points of the probe data tracks were generated, wherein causing the apparatus to determine locations at which people board the public transit vehicle comprises causing the apparatus to:
for each probe data track, determine if their respective track intersecting the first transit stop coincides with a time associated with the public transit route for the first transit stop; and determine, for each person of the plurality of people, that they boarded the public transit vehicle at the first transit stop in response to the speed associated with their respective track being above the first predetermined threshold after the first transit stop and the respective track intersecting the first transit stop coinciding with the time associated with the public transit route at the first transit stop.

13. The apparatus of claim 9, wherein causing the apparatus to determine, from the number of people boarding the public transit vehicle at each respective transit stop location and the number of people exiting the public transit vehicle at each respective transit stop location, ridership data associated with the public transit route comprises causing the apparatus to:
  determine the number of people boarding the public transit vehicle at each respective transit stop location according to the probe data points associated with movement of the plurality of people;
  determine the number of people exiting the public transit vehicle at each respective transit stop location according to the probe data points associated with movement of the plurality of people; and
  extrapolate the number of people boarding the public transit vehicle and the number of people exiting the public transit vehicle according to the number of people having boarded the public transit vehicle determined based on a passenger count from a public transit authority.

14. The apparatus of claim 9, further comprising causing the apparatus to cause alteration of the public transit route in response to the ridership data associated with the public transit route by adding or removing transit stops from the public transit route.

15. The apparatus of claim 9, wherein ridership data comprises the number of people riding the public transit vehicle between each respective public transit stop.

16. The apparatus of claim 9, wherein the apparatus is further caused to:
  determine route adherence to a timetable of the public transit vehicle along the public transit route based on transit stop locations and time information of the probe data points at the respective transit stop locations.

17. A method comprising:
  receiving probe data points associated with movement of a plurality of people;
  associating the movement of the plurality of people with a public transit route having a plurality of transit stop locations;
  determining, from the probe data points associated with movement of the plurality of people, transit stop locations at which people board a public transit vehicle associated with the public transit route;
  determining, from the probe data points associated with movement of the plurality of people, transit stop locations at which people exit the public transit vehicle associated with the public transit route;
  calculating, from the probe data points associated with the movement of the plurality of people, a number of people boarding the public transit vehicle at each respective transit stop location, and a number of people exiting the public transit vehicle at each respective transit stop location; and
  determining, from the number of people boarding the public transit vehicle at each respective transit stop location and the number of people exiting the public transit vehicle at each respective transit stop location, ridership data associated with the public transit route; and
  causing alteration of the public transit route in response to the ridership data associated with the public transit route.

18. The method of claim 17, wherein the probe data points comprise probe data tracks, with each track reflecting a path of an individual person, wherein determining locations at which people board the public transit vehicle comprises:
  for each person of the plurality of people, determining if their respective track intersects a first transit stop;
  determining if a speed associated with the respective track is above a first predetermined threshold after the first transit stop; and
  determining, for each person of the plurality of people, that they boarded the public transit vehicle at the first transit stop in response to their respective track intersecting the first transit stop and the speed associated with their respective track being above the first predetermined threshold after the first transit stop.

19. The method of claim 18, wherein determining locations at which people exit the public transit vehicle comprises:
  for each person of the plurality of people, determining if their respective track diverges from the public transit route at a second transit stop;
  determining if a speed associated with the respective track is above the first predetermined threshold before the second transit stop;
  determining if a speed associated with the respective track is below a second predetermined threshold after the second transit stop; and
  determining, for each person of the plurality of people, that they exited the bus at the second transit stop in response to their track diverging from the public transit route at the second transit stop, the speed associated with their respective track being above the first predetermined threshold before the second transit stop, and the speed associated with their respective track being below the second predetermined threshold after the second transit stop.

20. The method of claim 18, wherein the probe data tracks comprise probe data time at which time the probe data points of the probe data tracks were generated, wherein determining locations at which people board the public transit vehicle comprises:
  for each probe data track, determining if their respective track intersecting the first transit stop coincides with a time associated with the public transit route for the first transit stop; and
  determining, for each person of the plurality of people, that they boarded the public transit vehicle at the first transit stop in response to the speed associated with their respective track being above the first predetermined threshold after the first transit stop and the respective track intersecting the first transit stop coinciding with a time associated with the public transit route at the first transit stop.

21. The method of claim 17, wherein determining, from the number of people boarding the public transit vehicle at each respective transit stop location and the number of people exiting the public transit vehicle at each respective transit stop location, ridership data associated with the public transit route comprises: determining the number of people boarding the public transit vehicle at each respective stop according to the probe data points associated with movement of the plurality of people;
  determining the number of people exiting the public transit vehicle at each respective stop according to the probe data points associated with movement of the plurality of people; and
  extrapolating the number of people boarding the public transit vehicle and the number of people exiting the public transit vehicle according to the number of people having boarded the public transit vehicle determined based on a passenger count from a public transit authority.

22. The method of claim 17, further comprising determining route adherence to a timetable of the public transit vehicle along the public transit route based on transit stop locations and time information of the probe data points at the respective transit stop locations.

* * * * *